Nov. 10, 1959        J. LATZEN        2,912,267
BALL AND SOCKET JOINTS
Filed Nov. 22, 1954                    2 Sheets-Sheet 2
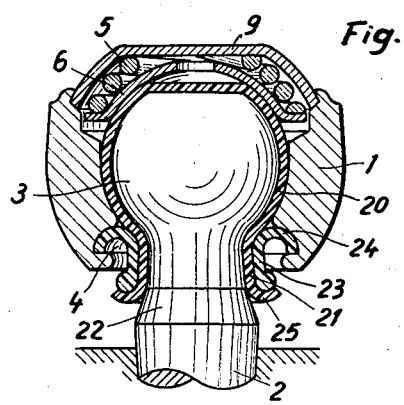
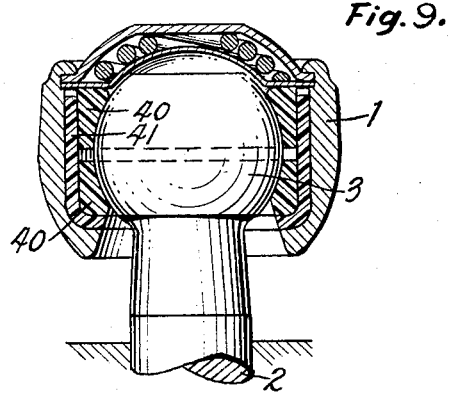
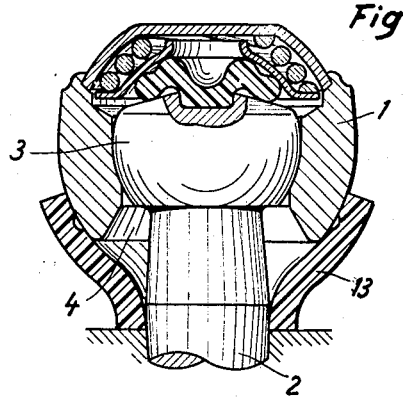
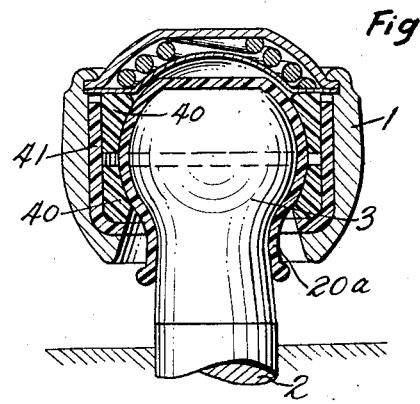
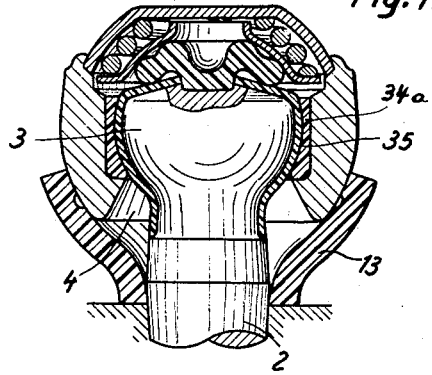
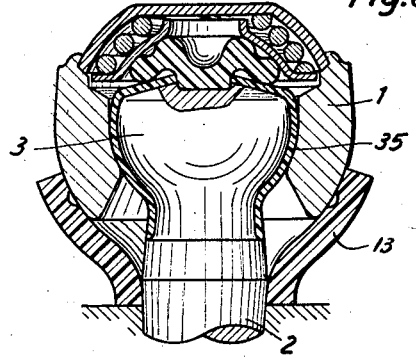
*Inventor*
JOSEF LATZEN
By Robert H. Jacob
*Agent*

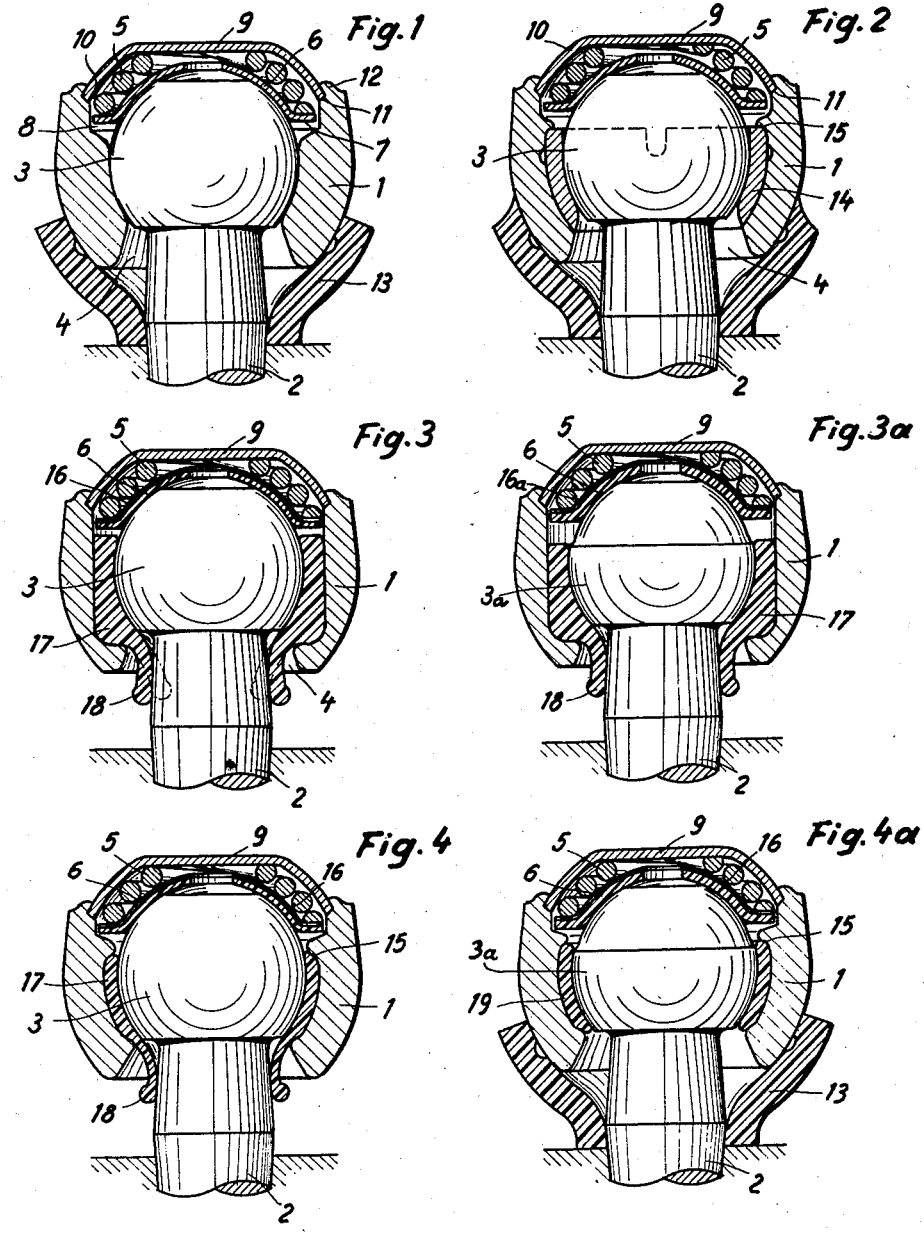

United States Patent Office 2,912,267
Patented Nov. 10, 1959

2,912,267

BALL AND SOCKET JOINTS

Josef Latzen, Dusseldorf-Oberkassel, Germany, assignor to A. Ehrenreich & Cie., Dusseldorf-Oberkassel, Germany Application November 22, 1954, Serial No. 470,402

Claims priority, application Germany November 20, 1953

2 Claims. (Cl. 287—90)

The invention relates to a ball joint for the transmission of steering and control forces or the like, in particular for the steering and control linkages of motor vehicles, in which the ball end or head of a pivot is mounted in a hollow spherical surface in the joint housing, which comprises a closure on the side remote from the exit for the ball pivot and in which a spring force tending to press the ball end into the seat formed by the hollow spherical surface from the side where the closure is located is provided, and has for its object in particular the provision of a ball joint of reduced overall height, a wear and friction-reducing design of the ball joint being possible and it also being possible for any elasticities in the joint, such as, for example, for absorbing vertical shocks, to be preserved.

Ball joints of the type with which the invention is concerned are known in the most varied structural forms. In these structural forms, a reduction in the over-all height, such as is provided by the invention, is not possible, if a simple form of construction of the joint is to be preserved. In addition, the known joints lack a form of construction which does not require servicing, combined with resistance to wear and great sliding capacity. Likewise, the ball head does not rest in its seat so that, in the event of stresses in the direction of the axis of the ball pivot and, in fact, both directions of said axis, the bearing surfaces of said seat remain lying against the ball end.

According to the invention, a spiral spring curved similarly or substantially similarly to the ball end in the direction of the height of said spring is provided as the spring force. Owing to this, the spring device can have an effect on the over-all height substantially only within the limits of the thickness chosen for the wire of the spring.

The spring expediently acts within a cylindrical housing part through a plate having a curvature adapted to the curvature of the ball end and provided with a marginal shoulder for the abutment of the spring of a size adapted to the thickness of the spring wire, the diameter of said cylindrical housing part being adapted to the diameter of the plate resulting by reason of the shoulder. The plate prevents any impairment of the turning capacity of the joint pivot comprising the ball end by the spring and has in the housing a guide permitting any axial play which may be necessary in opposition to the spring action.

A flat cap, for example of sheet metal, having a curvature of the marginal zone adapted to the curvature of the spring, may be provided as the housing closure, an inclined recess for mounting the peripheral edge of the flat cap being provided on the side where the housing closure is located at the inner edge of the housing and sunk into the latter. The projection of the housing wall beyond the recessed portion can be turned over on to the outside of the flat cap for the purpose of securing the cap. Since the housing closure is adapted to the conditions arising out of the design of the spring, it likewise does not entail any important increase in the over-all height of the joint.

It may be expedient to provide between the plate and the ball $a$, preferaby, more or less elastic means conveniently having properties which increase the sliding capacity and reduce the wear and having an external curvature adapted to the curvature of the plate. If the means is elastic, it operates simultaneously to absorb shocks and oscillations in the direction of the axis of the joint pivot comprising the ball end.

There may preferably be used as the means to be arranged between the ball end and the plate elements consisting of synthetic resin having suitable properties, if necessary with additions which reduce the wear and increase the sliding capacity, such as elements made from polycondensation or polyaddition products, such as polyamides and superpolyamides, in particular polycondensation products of adipic acid and hexamethylene diamine, polyurethane or from glycol polyester reacted with diisocyanates, particularly naphthylene diisocyanates.

Such synthetic resins may also be employed for other parts of the ball joint, in particular those which move against one another, and also for the sealing cap. In this connection, the nature of the synthetic resin to be selected depends on where it is to be applied and the properties which it is desired to obtain by means of the resin. With the said synthetic resins, all the properties which may prove to be necessary in ball joints can be commanded, since some of the synthetic resins are rigid or have only slight elasticity and the others are highly elastic. In addition, there is the fact of the special properties of the said synthetic resins as regards strength, wear and sliding capacity.

With the said synthetic resins, there may also be a question of the employment of synthetic resins of different kinds or properties in co-operation with one another. Thus, for example, a surface may co-operate through an element of highly-elastic synthetic resin with a surface of an element of less elastic or non-elastic synthetic resin. Likewise, there is the possibility of combining the synthetic resins with one another, in that, for example, one layer of synthetic resin is brought together with another layer of synthetic resin. It is possible in itself, for example, to produce the inserted body for forming the ball seat from a non-elastic synthetic resin, while the sliding or running surface of this body is formed by a layer of elastic synthetic resin. Such combinations are also possible with inserted bodies made of fabric and the fabric may be impregnated with a synthetic resin of a suitable type. Synthetic resins of the same kind and/or having the same properties can be assembled in layers, if required also providing suitable intermediate layers, as can also synthetic resins of different kinds and different properties, to form the desired body. A cement or the like can be employed as the means of assembly. When the synthetic resin is inserted in a steel part of the joint or when a bearing surface is formed by the synthetic resin, joining with the steel part or the non-ferrous metal part can be effected by cementing. Recesses or holes, into which the synthetic resin penetrates, may likewise serve for securing the synthetic resin, if necessary in conjunction with a cement.

As compared with polyamides, polyurethanes possess the advantage of swelling less on exposure to water, while the synthetic resin on the basis of glycol polyester reacted with diisocyanates, particularly naphthylene diisocyanates, which is preferably to be employed in most cases has the advantage of great elasticity and, in particular, the advantage, which is so important for ball joints, that it, so to speak, swallows up dust and fine sand, so that such impurities penetrating into the joint in small quantities in spite of the packings which have been provided cannot lead to any wearing out or to the formation of furrows or grooves. The water-swellability of this synthetic resin can be regarded as nil for practical purposes and, moreover, is compensated by the good elastic properties of the synthetic resin. Such properties of compensation may also be of importance in the combination of different kinds of synthetic resins with one another or with fabric bodies.

The synthetic resin based on glycol polyester reacted with diisocyanates also has the advantage that it may exhibit a porous or foamy structure, whereby the lubrication problem can be solved particularly favourably, since saturation of this synthetic resin with a lubricant is possible.

In the case of synthetic resins to be worked into joint parts by the injection moulding method, it is advisable to design the part so that it has the same thickness at every point, since, in this way, a uniform structure is obtained. With metals etc., observation of this requirement is of no special importance.

The means interposed between the plate and the ball end may consist of a plate coating or lining having a curvature adapted to the ball end on the side facing towards the ball end. It is possible, in this case, to reduce the thickness of the plate by the thickness of the coating or lining. This form of construction is particularly simple and designed, above all, for those ball joints in which the ball end forms directly the sliding surface in the joint which is on the side where the closure is located. As a rule, it will be expedient to choose a synthetic resin having elastic properties as the plate coating.

Another form of construction consists in providing the ball end with a coating composed of one of the synthetic resins mentioned, synthetic resins having elastic properties, such as are possessed by synthetic resins produced on the basis of glycol polyester reacted with diisocyanates, particularly napthylene diisocyanates, being likewise used.

In the case of ball joints having a ball end cut away or offset in the direction of the housing closure to form a spherical segment, it is advisable to provide for the cut-away portion of the ball end, as a means for the plate to act on the ball end between the plate and said ball end, an intermediate element bridging the cut-away portion, preferably consisting of more or less elastic material and having a surface of contact with the plate adapted to the curvature of said plate. In this connection, the synthetic resins already mentioned, in particular the elastic ones, are likewise preferably employed as the materials.

There is also the possibility of providing both the plate on the side facing towards the ball end with a covering, preferably consisting of the said synthetic resins, and at the same time also the ball end with a casing preferably consisting of one of the said synthetic resins. In this case, for example, the one synthetic resin may have no elastic properties while the other synthetic resin is elastic or highly elastic. The same possibility also exists if the ball end forms only a spherical segment and an intermediate element is provided for bearing on the plate.

If the ball end is provided with a casing, then, in addition to the advantage already mentioned, there is also the further advantage that the fit of the ball end in the joint is also improved, because it, too, partakes of the favourable properties of the casing material chosen. Naturally, in this case, the ball cup or socket provided at the exit of the ball pivot from the joint housing may also consist of a synthetic resin, if required with elastic properties, or of a suitably impregnated fabric.

The intermediate element may be provided with a central portion projecting on the side facing towards the cut-away surface of the ball end, which central portion engages in a corresponding recess in the cut-away surface. This offers the advantage that there is a complete assurance that the intermediate element will follow the movements of the ball end.

The cut-away surface of the ball end may have a slightly conical shape, whereby there results an improved bearing of the intermediate element against the cut-away surface for the purpose of the carrying along of the intermediate element by the ball end.

Particularly in the case of an elastic construction of the intermediate element due to the choice of a suitable material, it is advisable to recess the intermediate element in the centre on the side facing towards the plate in order thereby to increase the elasticity of the intermediate element. In the case of rigid intermediate elements, the recesses serve to accommodate a supply of lubricant.

In the object of the invention, the ball seat may also be formed by inserted cups or inserted cup-like members, for which one of the above-mentioned synthetic resins can be chosen, while taking into account the properties to be given to the joint, without, however, thereby excluding the use of steel or other metal for the inserted member providing the ball seat.

The choice of elastic materials, in particular elastic synthetic resins, even permits of dispensing with the spring on the side where the housing closure is located, in that the cover element acts directly on an elastic cup or bowl element on the side of the ball end facing towards said cover element.

In this case, the capacity for elastic compression through the cover element and also the elastic yieldingness in the direction of the axis of the ball pin can be increased by the surface of the elastic cup element lying against the housing closure being corrugated or having a surface form giving the same effect as the corrugation. In addition, the surfaces of the inserted elements which lie against the wall of the housing inside said housing can be provided with recesses increasing the flow capacity of said inserted elements and thereby the elastic properties thereof, which recesses, for example, have the form of annular grooves or similarly formed indentations.

There is also the possibility of recessing one or the other or both of the cup elements at their outer periphery in such manner that a loading coil spring can be housed in the recess.

Furthermore, it is possible according to the invention to form the ball seat by means of inserted elements made of fabric, which, if necessary, is impregnated with a suitable synthetic resin of the type mentioned, according to the properties desired, with or without admixtures for reducing the wear and increasing the sliding capacity, the fabric element being divided at right-angles to the circular direction if, without itself possessing elastic properties, it embraces the ball end above and below the plane transverse to the axis of the ball pivot and taken through the middle of the ball end and is elastic, a rubber lining, preferably of cylindrical external ambient surface being provided between the inserted element and the housing surfaces supporting it. The loading of the cup ring, including the rubber lining, can also be effected here through a plate having a convex curvature adapted to the curvature of the ball and a spiral spring curved in the direction of its height according to the curvature of the ball.

If the seat for the ball end consists of an elastic material, in particular one of the synthetic resins with highly-elastic properties which have been mentioned, on the side of the ball end facing the exit for the ball pivot from the housing, the inner edge of the seat expediently fits closely against the neck of the ball pivot. The choice of a bearing for the ball end having elastic properties and fitting closely against the neck of the ball pivot affords the great advantage that even in the case of wide-angled deflections or swinging, i.e. large angular deflections, of the ball pivot, the sealing of the bearing surface against the penetration of impurities is always maintained, without the bearing surface of the ball end undergoing any reduction. At the same time, tilting of the joint linkage is also effectively prevented. Of course, the same advantages also obtain if the elastic bearing surrounds the ball end in the form of a one-piece part above and below a plane taken transversely to the axis of the ball pivot through the middle of the ball end, while fitting closely against the neck of the ball pivot.

Preferably, the ball joint according to the invention is provided at the exit of the ball pivot from the joint housing with an elastic lip constituting an extension of the insert forming the seat for the ball end, which lip fits against the neck of the ball pivot. This elastic lip, which changes into the ball seat, is particularly favourable for sealing the joint.

The lip may form a special additional part, of which the edge located in the housing opening is disposed flange-like between the inserted element forming the ball seat and the housing shoulder serving as the mounting surface for the inserted element. This form of construction is to be employed in particular if the ball seat consists of nonelastic material.

If the inserted element used to form the ball seat consists of an elastic material, the lip and the inserted element may be formed in one piece. In this case, it is possible for the part of the inserted element forming the lip to have a greater elasticity than the part of the inserted element forming the ball seat. In this way, account is taken of the fact that the lip must follow the angular deflections of the ball pivot without impairment of its close fit against the neck of the ball pivot.

Here, too, it is possible to preserve the advantages which are provided when the ball seat facing towards the exit side, being composed of elastic material, has a close fit against the neck of the ball pivot.

In special cases, it may be an advantage to provide a second elastic lip, an edge of which, preferably rounded off on the outside and turned over, is inserted in the exit apertures for the ball pivot from the housing, while the remaining part thereof fits against the lip lying against the neck of the joint pin. The second lip improves the fit of the lip lying against the joint pin, the rounded edge of the lip increasing the contact pressure similarly to a leaf spring.

The free edge of the lip fitting against the neck of the ball pivot can be turned over outwardly, preferably in a rounded shape, to accommodate the free edge of the second lip lying against said first free edge, said free edge of the second lip being expediently thickened. In this way, the second lip is provided with a mounting which increases the tightness between the two lips.

One of the above-mentioned synthetic resins having elastic properties may be used, in particular, as the elastic material for the lips, because it swallows up any dust and dirt which may penetrate into the interior and prevents the dust or dirt from travelling any further into the joint.

An additional sealing means for the opening in the joint housing for the exit of the ball pivot can also be obtained by providing on the inserted element for forming the ball seat and which is arranged at the opening in the housing for the exit of the ball pivot, a lip made of elastic material, preferably one of said synthetic resins, and ending more or less in a point, which lip engages the underside of the ball end and lies against the ball pivot under initial tension. The lip may form one piece with the inserted element or also form an indepedent part. During angular deflections of the ball pivot, the lip can yield without its fit being impaired, an increased application of the lip to the surface of the neck of the ball pivot being produced in the direction of the angular deflection.

If the ball seat on the side facing towards the exit for the ball pivot from the housing is formed by an inserted element, said inserted element can be secured in the housing by means of projections overlapping its edge on the side where the housing closure is located and distributed uniformly over the internal periphery of the housing in the circumferential direction.

Owing to the choice of synthetic resins of the type mentioned, the possibility is also provided of dispensing with hardening of the ball end, which is of special importance as regards rendering manufacture of the joint cheaper.

A very special advantage is obtained according to the invention if the joint is so designed that individual parts of the joint can be exchanged for parts having other properties and parts which are differently shaped, without altering the joint housing and, if required, also without altering any parts remaining in the joint in any particular instance. In this way, the possibility is provided of assembling ball joints having the properties desired in any given case on the prefabrication system, in that the parts are so constructed that they can always be inserted in a joint. Owing to this, it is possible to keep in stock a range of component parts by means of which a joint is then assembled at any given time in accordance with the desired properties and with the aid of which the properties of a joint and, if desired, also the internal structure thereof, can be altered by exchange. Thus, for example, a ball pivot with an encased ball end can be exchanged for a ball pivot having a ball end which is not encased, or the elements forming the bearing surfaces for the ball end are exchanged with or without exchanging the ball pivot with the ball end. Likewise, the elastic pressure means can be exchanged and replaced by others, and so forth. It is a question here of adapting the joint elements to one another in such manner that they can be exchanged for one another without regard to shape and properties.

By means of the invention, the possibility is also provided of the bearing surfaces in the joint housing forming a braced unit with the ball end.

This offers the advantage that, in the event of stresses in the direction of the axis of the ball pivot, and in fact, in both directions of said axis, the bearing surfaces always remain applied against the ball end, so that the latter always rests in the bearing surfaces free from play. This fact is of importance in particular for the prevention of any deflection of the joint. Over and above this, the penetration of dirt, dust, etc. into the joint is also prevented.

The bracing effect may be obtained, for example, in that there is provided for the ball end on the closure side of the housing and on the side of the housing where the exit is located, a bearing which is under the action of an elastic means pressing it against the ball end, so that the bearing itself may consist of a rigid material, iron or non-ferrous metals or a synthetic resin of said nature or a synthetic resin of relatively low elasticity. Other means for obtaining the bracing action are formed by elastic bearing cups or boxes, in which the ball end rests under a preferably yielding pressure. In this case, securing of the bearing against play in the housing is also provided. The desired bracing action can also be obtained with the aid of an elastic casing for the ball end and a suitable pressure loading of said ball end. A further example of the manner in which the bracing action can be obtained consists, inter alia, in supporting the inserted elements forming the bearing surfaces at the back by means of elastic pressure elements, for example in the form of elastic rings made of rubber or synthetic resin having the same or similar properties of elasticity. In this case, the bearing elements may in themselves be rigid and be divided at right-angles to the circumferential direction. The elastic bracing action can be obtained with all the examples of embodiment which have been described, it being necessary to choose suitable materials depending on said examples of embodiment.

The drawing illustrates various examples of embodiment of the invention. More particularly, Fig. 1 illustrates in cross section a ball and socket joint embodying the invention;

Figs. 2 and 3 illustrate in cross section modifications of the embodiment illustrated in Fig. 1;

Fig. 3a illustrates in cross section a modification of the structure shown in Fig. 3 wherein the ball end has a reduced diameter;

Fig. 4 illustrates in cross section a further modification of the structure illustrated in Figs. 1, 2 and 3;

Fig. 4a illustrates in cross section a modification of the structure shown in Fig. 4;

Figs. 5, 6, 7, 8 and 9 illustrate in cross section further modifications of the structures shown in Figs. 1 through 4 and embodying more detail of the ball supporting structure; and Fig. 10 illustrates in cross section a modification of the structure shown in Fig. 9 wherein the ball end is provided with a casing.

The housing of the ball joint is indicated by 1, while the ball end of the ball pivot 2 has the reference numeral 3.

In Fig. 1, the seat for the ball end in the housing on the side facing towards the opening 4 for the exit of the ball pivot from the housing is formed directly by the housing. The ball end is under the action of a spiral spring 5, which, in the direction of its height, is curved in accordance with the curvature of the ball end. Between the spring 5 and the ball end there is provided a plate 6, which has a curvature adapted to the rounding of the ball end and a marginal shoulder 7 for the abutment of the spring against said plate. The width of the marginal shoulder 7 corresponds substantially to the thickness of the wire chosen for the spring. The plate is guided by means of the marginal shoulder in a cylindrical portion 8 of the joint housing. There is provided as the housing closure a flat cap 9, the marginal zone 10 of which is curved substantially parallel with the curvature of the ball. An inclined cut-away portion 11 for mounting the peripheral edge of the flat cap is provided in the housing and is sunk therein. The projection 12 of the housing wall beyond the cut-away portion is turned over on to the outside of the sheet metal flat cap. An elastic sleeve 13 serves as the packing for the opening for the exit of the ball pivot 2 from the housing, said sleeve consisting of rubber or a suitable synthetic material and being applied, on the one hand, against the outer surface of the housing and, on the other hand, against the ball pivot.

According to Fig. 2, the ball seat on the side facing the exit opening 4 in the joint housing is formed by a cup-shaped inserted element 14. This inserted element is secured in the housing by means of projecting noses 15 which are distributed uniformly in the interior of the housing in the circumferential direction. The inserted element may consist of steel or one of the synthetic resins previously mentioned, synthetic resins having elastic properties and so-called swallowing capacity being preferable. The formation of the inserted element out of a fabric impregnated with synthetic resin, with or without additions for increasing the sliding capacity and reducing the wear, is also possible. The synthetic resins which have been mentioned are preferably employed.

The example of embodiment according to Fig. 3 shows the equipment of the plate 6 with a covering 16 consisting of one of the synthetic resins mentioned, synthetic resins having highly-elastic properties, such as synthetic resins on the basis of glycol polyester reacted with diisocyanates, being likewise preferable. There can also be seen in Fig. 3 the formation of the lower ball seat by means of an inserted element 17 consisting of one of said synthetic resins having elastic properties. The inserted element 17 comprises a lip-like elastic appendage extending through the opening 4 for the exit of the ball pivot 2 from the housing, said appendage being applied against the neck of the ball pivot. The lip-like appendage 18 may have a greater elasticity than the part of the inserted element 17 supporting the ball end.

Fig. 3a illustrates a ball and socket joint similar to that shown in Fig. 3 wherein the ball end 3a on the side facing the housing closure cap 9 is somewhat reduced in diameter and the covering 16a has a somewhat greater thickness.

The example of embodiment shown in Fig. 4 corresponds substantially to the example of embodiment shown in Fig. 3, but the inserted element 17 provided with the lip 18 has a somewhat different shape to that in Fig. 3. In Fig. 4, the inserted element is secured both in the right-hand half and in the left-hand half by means of noses 15, as shown in Fig. 2.

Fig. 4a illustrates a ball and socket joint similar to that shown in Figs. 3a and 4 wherein the inserted element 19 has no lip-like appendage as shown in Fig. 4. Element 19 may consist of one of the synthetic resins or a fabric impregnated in the manner disclosed.

Fig. 5 shows an example of embodiment in which the ball end 3 is provided with a casing 20 consisting of the synthetic resins. In the case of this example of embodiment, elastic synthetic resin, such as synthetic resin on the basis of glycol polyester reacted with diisocyanates, is employed as the material. The casing is extended to form a lip 21 which lies against the neck 22 of the ball pivot 2. The rounded edge 24 of a second lip or mouthpiece 23 is inserted in the exit opening 4 in the housing and is applied against the lip 21. The free edge 25 of the lip 21 is rounded towards the outside and turned over and accommodates the free edge of the lip 23. Preferably, the free edge of the lip 23 is thickened.

In the example of embodiment shown in Fig. 6 the ball seat is formed directly by the housing 1 and a packing sleeve 4 is provided.

According to Fig. 7, while retaining the form of construction according to Fig. 6, the ball end is provided with a casing 35 consisting of one of said synthetic resins, which expediently has elastic properties. An inserted element 34a, made, for example, of synthetic resin, is provided as the bearing seat. Fig. 8 illustrates a ball and socket joint similar to that shown in Fig. 7 wherein the inserted element 34a is omitted and casing 35 bears directly against housing 1.

As can be seen from Fig. 9, the ball seat consists of an elastic inserted element 40, which is divided into an upper and a lower part by a horizontal separating gap and may consist of one of said synthetic resins. The inserted element lies against the ball end both above the plane taken through the centre of the ball end transversely to the axis of the ball pivot and below said plane. Between the housing surfaces and the inserted element 40 there is provided a rubber lining 41.

Fig. 10 illustrates a modification of the structure shown in Fig. 9 wherein the ball end 3 is provided with a casing 20a.

If, for example, in the ball joint according to Fig. 4, the bearing at the opening for the exit of the ball pivot from the joint housing is formed out of an elastic synthetic resin so that it lies in sealing relationship against the ball pivot, the synthetic resin used being glycol polyester reacted with diisocyanates in particular, the sealing of the joint at this point is maintained without reduction in the size of the bearing surface for the ball end even where there are large angular deflections of the ball pivot and the steering linkage has a protection against tilting.

Synthetic resin used for the ball seat may be the same as the synthetic resin forming the casing. It is also possible, however, to choose for the ball seat a synthetic resin without elastic properties and for the casing a synthetic resin with elastic properties or vice versa. The choice of rubber for the seat and of synthetic resin for the casing or vice versa is also possible. In this case, a synthetic resin with or without elastic properties can be chosen. The bracing of the ball end with the seat is effected through the closure cover, which acts directly on the seat element on the closure side.

The synthetic resins proposed do not exclude the use of rubber without, or in conjunction with one of the synthetic resins.

I claim:

1. Ball and socket joint for the steering gear of motor vehicles comprising a ball headed rod having a ball head in the form of a spherical section defining a circular end surface having a recess therein, a housing disposed about the ball head of said rod having an upper aperture and a lower aperture of a diameter smaller than said upper aperture and smaller than the diameter of said ball head, a lower spherical surface extending in said housing above said lower and below said upper aperture constituting a bearing in engagement with the lower portion of said ball head, a recess extending around the periphery of said housing adjacent said upper aperture and defining a shoulder in said housing, a closure having a flat end surface, a curved wall portion and a periphery in engagement with said shoulder, and said housing having a peened over portion above said shoulder retaining said closure on said shoulder, resilient means biased by way of said closure against said housing and providing spring pressure in the direction of said ball head and toward said bearing, and a curved shell defining on one side an upper spherical surface disposed between said closure and the upper end of said ball head concentric with said ball head and operative to transfer the spring pressure from said resilient means to said ball head, and defining on the other side with said curved wall portion an upwardly and inwardly curved chamber said resilient means being defined by a spiral spring of substantially frusto-conical shape and of substantially the height of said curved wall, and said spring, said shell, said curved wall portion and thereby said chamber having substantial portions projecting above said peened over portion correspondingly decreasing the height of said housing said housing having a cylindrical part below said closure and said curved shell having a marginal shoulder extending outwardly from said upper spherical area toward the walls of said cylindrical part and the turn of largest diameter of said spring being supported on said shoulder, and an intermediate packing member constituting the upper spherical end portion of the ball head disposed between said curved shell and the upper end of said ball head and having a member extending into said recess.

2. Ball and socket joint for the steering gear of motor vehicles comprising a ball headed rod having a ball head in the form of a spherical section defining a circular end surface having a recess therein, a housing disposed about the ball head of said rod having an upper aperture and a lower aperture of a diameter smaller than said upper aperture and smaller than the diameter of said ball head, a lower spherical surface extending in said housing above said lower and below said upper aperture constituting a bearing in engagement with the lower portion of said ball head, a recess extending around the periphery of said housing adjacent said upper aperture and defining a shoulder in said housing, a closure having a flat end surface, a curved wall portion and a periphery in engagement with said shoulder, and said housing having a peened over portion above said shoulder retaining said closure on said shoulder, resilient means biased by way of said closure against said housing and providing spring pressure in the direction of said ball head and toward said bearing, and a curved shell defining on one side an upper spherical surface disposed between said closure and the upper end of said ball head concentric with said ball head and operative to transfer the spring pressure from said resilient means to said ball head, and defining on the other side with said curved wall portion an upwardly and inwardly curved chamber said resilient means being defined by a spiral spring of substantially frusto-conical shape and of substantially the height of said curved wall, and said spring, said shell, said curved wall portion and thereby said chamber having substantial portions projecting above said peened over portion correspondingly decreasing the height of said housing said housing having a cylindrical part below said closure and said curved shell having a marginal shoulder extending outwardly from said upper spherical area toward the walls of said cylindrical part and the turn of largest diameter of said spring being supported on said shoulder, and an intermediate packing member constituting the upper spherical end portion of the ball head disposed between said curved shell and the upper end of said ball head and having a member extending into said recess, said member being of elastic material and having a surface extending over said circular end surface of said ball head, a surface corresponding to the curvature of said curved shell and a central recess facing said closure.

References Cited in the file of this patent

UNITED STATES PATENTS

| | | |
|---|---|---|
| 2,110,561 | Stephens | Mar. 8, 1938 |
| 2,122,655 | Niles | July 5, 1938 |
| 2,424,431 | Booth | July 22, 1947 |
| 2,426,358 | Klages et al. | Aug. 26, 1947 |
| 2,707,645 | Moskovitz | May 3, 1955 |
| 2,779,603 | McRae | Jan. 29, 1957 |

FOREIGN PATENTS

| | | |
|---|---|---|
| 601,035 | Great Britain | Apr. 26, 1948 |
| 1,012,630 | France | Apr. 16, 1952 |